United States Patent [19]

Nagano et al.

[11] Patent Number: 5,558,820
[45] Date of Patent: Sep. 24, 1996

[54] PROCESS FOR PREPARING MICROCAPSULES

[75] Inventors: Hideo Nagano; Kazuo Niwa; Takayuki Hayashi, all of Shizuoka, Japan

[73] Assignee: Fuji Photo Film Co., Ltd., Kanagawa, Japan

[21] Appl. No.: 453,453

[22] Filed: May 30, 1995

Related U.S. Application Data

[63] Continuation of Ser. No. 165,527, Dec. 13, 1993, abandoned, which is a continuation of Ser. No. 827,647, Jan. 29, 1992, abandoned.

[30] Foreign Application Priority Data

Feb. 13, 1991 [JP] Japan ................................. 3-040617

[51] Int. Cl.⁶ ........................... B01J 13/02; B01J 13/16
[52] U.S. Cl. ........................... 264/4.1; 252/314; 264/4.7; 425/5; 428/402.21
[58] Field of Search ................ 264/4.1, 4.7; 428/402.21; 252/314; 366/135, 187; 425/5

[56] References Cited

U.S. PATENT DOCUMENTS

| | | | |
|---|---|---|---|
| 3,714,065 | 1/1973 | Kitajima et al. | 264/4.6 |
| 3,796,669 | 3/1974 | Kiritani et al. | 264/4.7 |
| 4,073,743 | 2/1978 | Midler, Jr. et al. | 252/314 X |
| 4,253,682 | 3/1981 | Baatz et al. | 264/4.7 X |
| 4,454,083 | 6/1984 | Brown et al. | 264/4.7 |
| 4,517,141 | 5/1985 | Dahm et al. | 264/4.7 |
| 4,814,376 | 3/1989 | Tanaka et al. | 252/314 X |
| 4,847,152 | 7/1989 | Jabs et al. | 428/402.21 |
| 5,089,339 | 2/1992 | Pietsch et al. | 264/4.7 X |
| 5,254,428 | 10/1993 | Ishikawa et al. | 264/4.7 |
| 5,370,824 | 12/1994 | Nagano et al. | 252/314 |
| 5,401,443 | 3/1995 | Nagano et al. | 264/4.7 |

FOREIGN PATENT DOCUMENTS

| | | |
|---|---|---|
| 57-84740 | 5/1982 | Japan . |
| 59-87036 | 5/1984 | Japan . |

OTHER PUBLICATIONS

Berkman et al.: *Emulsions and Foams*, Reinhold Publ. Corp., New York (1941) pp. 199–201. [TP 156 .E6 B45].

*Emulsion Technology, Theoretical and Applied*, 2nd Enlarged Edition, Chemical Publishing Co., Inc., Brooklyn, N.Y. (1946), pp. ix and 88–118.

*Principles of Polymer Engineering Rheology*, James L. White, John Wiley & Sons, Inc. (1990), p. 81.

*Primary Examiner*—Richard D. Lovering
*Attorney, Agent, or Firm*—Sughrue, Mion, Zinn, Macpeak & Seas

[57] ABSTRACT

A process for the preparation of microcapsules having a wall membrane made of a polyurethane urea resin, which includes steps of mixing an oily solution and an aqueous solution, passing the resulting mixed solution through a clearance between an inner cylinder and an outer cylinder which are rotated relative to each other to form an oil-in-water type emulsion, and then forming a wall membrane on droplets of the resulting emulsion. In a preferred embodiment, the clearance between the inner cylinder and the outer cylinder is preferably in the range of 0.05 to 5 mm, more preferably 0.1 to 2 mm. The retention time of the emulsion in the clearance portion is in the range of 0.02 seconds or more, preferably 0.2 seconds or more. The inner and outer cylinders are in the form of column, optionally conical in part thereof.

5 Claims, 2 Drawing Sheets

$D_{50} = 6.5 \mu m$
$D_{90}/D_{10} = 1.69$ $D_{50} = 6.7 \mu m$
$D_{90}/D_{10} = 3.0$

PROCESS FOR PREPARING MICROCAPSULES

This is a continuation of application Ser. No. 08/156,527 filed Dec. 13, 1993, now abandoned, which is a Continuation of application Ser. No. 07/827,647 filed Jan. 29, 1992, now abandoned.

BACKGROUND OF THE INVENTION

The present invention relates to a process for preparing microcapsules having a wall membrane made of a polyurethane urea resin. More particularly, the present invention relates to a process for preparing microcapsules having a uniform distribution of particle size.

Various processes for producing microcapsules have been known, including the coacervation process, the interfacial polymerization process and the in-situ process. Microcapsules prepared by these processes are widely used in various fields such as medicine, pesticides, dyes, adhesives, liquid fuels, perfumes and liquid crystals.

In these microcapsules, the particle size is an important factor that determines their quality. It is considered desirable to prepare microcapsules having a uniform particle size. In the case of microcapsules used for pressure-sensitive recording sheets, in general, the more uniform the particle size distribution, the better the coloring properties and pressure resistance of the sheet. The reason for this is considered to relate to the fact that microcapsules having considerably smaller particle sizes than the average value do not break upon coloring and thus do not contribute to coloring, while those having too great particle sizes are apt to rupture and thus easily cause so-called pressure fogging.

Thus, it has been important to obtain microcapsules with a desired particle size and a narrow particle size distribution in order to produce excellent pressure-sensitive recording sheets.

For this purpose, there has been proposed a process involving mixing an oily solution and an aqueous solution, pumping the resulting mixed solution through a cylindrical member in which is disposed a static liquid shearing device or a liquid shearing device which moves under the action of the passing solution to form an oil-in-water type emulsion, and then forming a wall membrane thereon to prepare microcapsules. Such a process is disclosed in JP-A-57-84740 (the term "JP-A" as used herein means an "Unexamined Published Japanese Patent Application"). There has also been proposed a process for the preparation of urea-formalin or melamine-formalin resin capsules which includes steps of mixing an oily solution and an aqueous solution, pumping the resulting mixed solution into a spindle through introduction pores opening tangentially at the center thereof while the solution is spirally rotated so that the solution reaches injection pores opening at both ends thereof to form an oil-in-water type emulsion, and then forming a wall membrane thereon to prepare microcapsules. This type of process is disclosed in JP-A-59-87036.

However, none of these processes can provide a particle size distribution sufficiently narrow to drastically improve the properties of the microcapsules since the shearing force acting on the emulsion is nonuniform in the emulsification process (where the particle size of microcapsules is determined). Thus, the particle size distribution can be narrowed only to some limited extent using these processes.

In another example of a known process, an emulsifying device such as a high-shear agitator, a homogenizer or an in-line mixer is used. However, this process can provide only an emulsion with a broad particle size distribution since the region on which the shearing force necessary for emulsification acts is limited to regions very near the emulsification blade, and the shearing force is nonuniform over the distance to the emulsification blade.

SUMMARY OF THE INVENTION

It is therefore an object of the present invention to provide a process for the preparation of microcapsules with a uniform particle size distribution by a simple mechanism to solve these problems.

The above and other objects of the present invention have been accomplished by a process for the preparation of microcapsules having a wall membrane made of a polyurethane urea resin, which process comprises mixing an oily solution and an aqueous solution, passing the resulting mixed solution through a clearance between an inner cylinder and an outer cylinder which are rotated relative to each other to thereby form an oil-in-water type emulsion, and then forming a wall membrane thereon.

DESCRIPTION OF THE PREFERRED EMBODIMENTS

The advantage of the emulsification process of the present invention is that, unlike the prior art emulsification process in which a nonuniform shearing force acts on an emulsion, it always provides a uniform shearing force on the emulsion. In accordance with the emulsification process of the present invention, microcapsules with a desired particle size and a narrow particle size distribution can be obtained.

Figure 1:
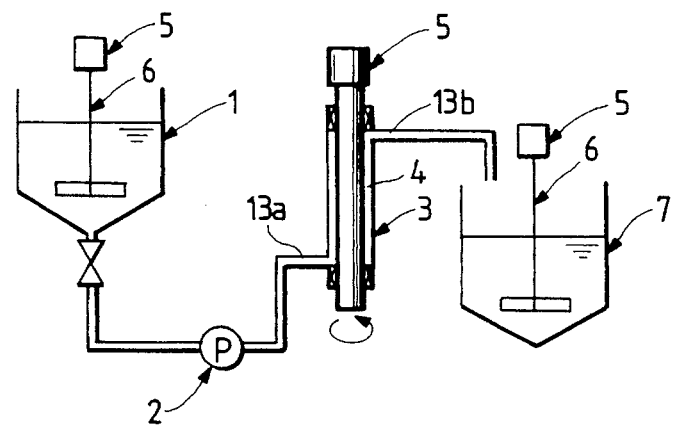
FIG. 1 is a diagram illustrating an apparatus used in the practice of a preferred embodiment of a process of the present invention.

The inventive process for the preparation of microcapsules will be outlined with reference to the embodiment shown in FIG. 1.

Referring to FIG. 1, an oily solution and an aqueous solution are mixed in a proper proportion in a preemulsifying tank 1 by stirring by an agitator 6 to prepare a preemulsion. The preemulsion is then pumped by a pump 2 into an outer cylinder 3 through a solution introduction port 13a mounted thereon. The outer cylinder 3 contains an inner cylinder 4 which is rotated by a motor 5. Once fed into the outer cylinder 3, the solution then moves toward a solution discharge port 13b while receiving a uniform shearing force between the outer cylinder 3 and the inner cylinder 4. The solution is then fed through the discharge port 13b to a capsulization tank 7 where it is subjected to wall membrane formation to obtain microcapsules.

In the present invention, the formation of an oil-in-water type emulsion can be accomplished by the use of an emulsifying apparatus including an inner cylinder 4 and an outer cylinder 3 which are rotated relative to each other.

In the inventive emulsifying apparatus, the clearance between the inner cylinder 4 and the outer cylinder 3 is not specifically limited, but is preferably in the range of 0.05 to 5 mm, more preferably 0.1 to 2 mm.

If the clearance falls below the above-specified range, the effects of the surface finish of the inner cylinder and outer cylinder and the deflection of the inner cylinder in the clearance become great, resulting in a nonuniform clearance distribution, and hence a nonuniform shearing force distribution, and hence a broader particle size distribution. Further, under this situation, the inner cylinder can come into contact with the outer cylinder, causing failure after prolonged use.

On the contrary, if the clearance exceeds the above-specified range, the rate of rotation of the inner cylinder must be increased to obtain a shearing force strong enough to provide a desired particle size. However, finely divided particles are produced in the vicinity of the inner cylinder, causing a wide particle size distribution.

The retention time of the emulsion in the clearance portion is in the range of 0.02 seconds, or more preferably 0.2 seconds or more. If the value falls below this range, a phenomenon called "short path" occurs, whereby coarse grains are formed that widen the particle size distribution.

The structure of the emulsifying apparatus of the present invention is not limited to that shown in FIG. 1.

The main feature of the dispersion process of the present invention is that emulsification occurs in the clearance between an inner cylinder and an outer cylinder which are rotated relative to each other. The inner and outer cylinders are preferably in the form of column. In other words, it is essential that the clearance between the inner cylinder and the outer cylinder be held constant to cause a uniform shearing force to act on the emulsion. In accordance with the process of the present invention, an emulsion with a desired particle size can be obtained at a single pass, and continuous production of such an emulsion is made possible.

Figure 2:
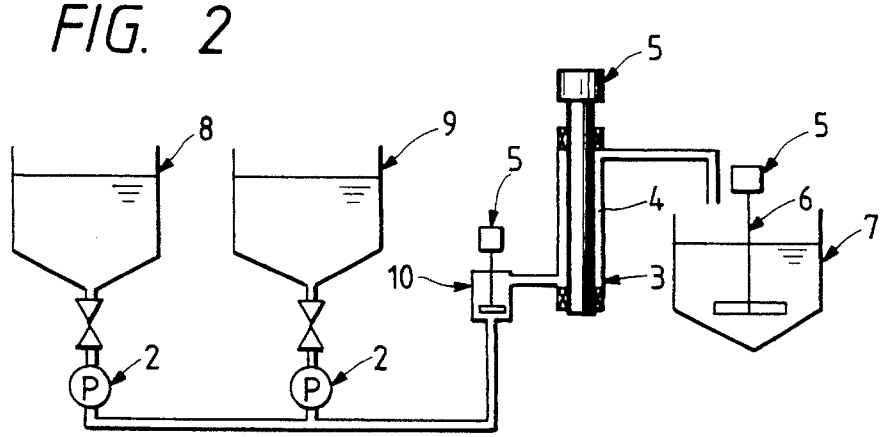
FIG. 2 is a schematic view of a system in which a continuous procedure begins with preemulsification.

FIG. 2 illustrates an embodiment in which an oily solution 9 and an aqueous solution 8 are continuously fed to a continuous preemulsifier 10 where a continuous procedure begins with preemulsification. In accordance with this process also microcapsules with a desired particle size and a uniform particle size distribution can be obtained.

Figure 3:
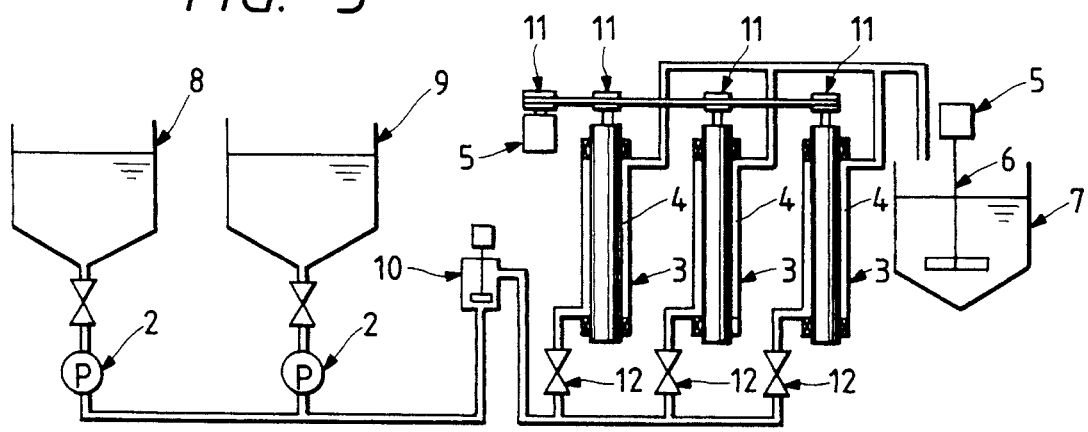
FIG. 3 is a schematic view of a system in which a large amount of material is effected.

FIG. 3 illustrates an embodiment in which three units of the emulsifiers used in the present invention are connected to raise the production efficiency. In accordance with this process, a large amount of material can be processed in a compact equipment, and microcapsules with a desired particle size and a uniform particle size distribution can be obtained. Reference numeral 11 renotes a pulley and reference numeral 12 renotes a distributing valve.

As mentioned above, in accordance with the emulsification process of the present invention, an invariably uniform shearing force can be applied to the solution, and an emulsion with a desired particle size and a uniform particle size distribution can be formed. The emulsion can be then subjected to wall membrane formation to produce microcapsules with a desired particle size and a narrow particle size distribution.

The present invention will be further described in the following examples, but the present invention should not be construed as being limited thereto. The present invention can also be applied to microcapsules for use in medicine, pesticides, dyes, adhesives, liquid fuels, perfumes, liquid crystals, etc.

EXAMPLE 1

As color developers, 100 gm of crystal-violet lactone, 10 gm of benzoyl leucomethylene blue, and 40 gm of 3-[4-(dimethylamine)-2-ethoxyphenyl]-3-(2-methyl-1-ethyl-3-indolyl)-4-azaphthalide were dissolved in 2,000 gm of diisopropyl naphthalene.

In the oily solution thus obtained were dissolved 160 gm of a carbodiimide-modified diphenylmethane diisocyanate (Millionate MTL available from Nihon Polyurethane K.K.) 160 gm of a biuret compound of hexamethylene diisocyanate (Sumidule N-3200 available from Sumitomo Bayer Urethane K.K.) as polyvalent isocyanates, and 64 gm of a butylene oxide adduct of ethylene diamine (added amount of butylene oxide per ethylene diamine: 16.8 mol; molecular weight: 1,267) as alkyl oxide adduct of amine to prepare an oily solution. 300 gm of a polyvinyl alcohol was dissolved in 2,700 gm of water to prepare an aqueous solution.

The oily solution was then poured into the aqueous solution while the latter was stirred at 800 rpm using a propeller agitator with a blade diameter of 70 mm to prepare an oil-in-water type emulsion as preemulsion.

The preemulsion was then processed at a single pass in the apparatus as shown in FIG. 1 at a flow rate of 1 kg/min and at a rotational speed of 1,500 rpm with the clearance between the inner cylinder and the outer cylinder set to 300 μm to obtain an emulsion. To the emulsion was added 2,000 gm of water with a temperature of 20° C. The system was heated to a temperature of 65° C. where it was held for 90 minutes to obtain a capsule solution.

Figure 4:
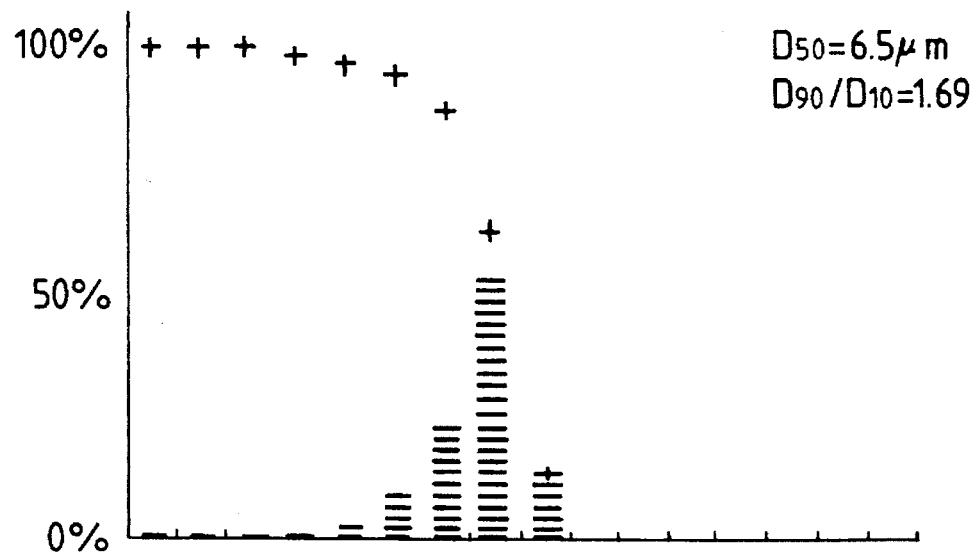
FIGS. 4 and 5 are graphs illustrating the particle size distribution and cumulative volume distribution in an example of the invention and in a comparative example, as determined by a Coulter counter (Coulter Electronics, Type TA-II).

These capsules were then measured for particle size distribution using a Coulter counter Type TA-II. As shown in FIG. 4, the specimen exhibited an extremely high uniformity in particle size distribution (D50=6.5 μm; D90/D10=1.69).

To the capsule solution thus obtained were added 2,000 gm of a 15% aqueous solution of a polyvinyl alcohol, 600 gm of a carboxy-modified SBR latex in the form of solid, and 1,200 gm of a particulate starch (average particle size: 15 μm). Water was then added to the system so that the solid concentration was adjusted to 20% to prepare a coating solution.

The coating solution thus obtained was coated on a paper with a density of 40 gm/m$^2$ in such an amount that the dried weight reached 4.0 gm/m$^2$, and then dried to prepare a microcapsule sheet.

EXAMPLE 2

A microcapsule sheet was prepared in the same manner as in Example 1, except that the preemulsion was processed at a single pass in the apparatus shown in FIG. 1 at a flow rate of 3 kg/min and a rotational speed of 2,000 rpm, with the clearance between the inner cylinder and the outer cylinder set to 500 μm.

The capsule specimen was measured for particle size distribution. It was found that the specimen exhibited an extremely high uniformity in particle size distribution (D50= 7.8 μm; D90/D10=1.70).

Comparative Example 1

The same oily solution as used in Example 1 was poured into the same aqueous solution as used in Example 1 while the latter was stirred at 2,000 rpm by a dissolver with a blade diameter of 100 mm. The agitation lasted for one minute. Thus, an oil-in-water type emulsion was formed.

To the emulsion was added 2,000 gm of water with a temperature of 20° C. The system was gradually heated to a temperature of 65° C. where it was held for 90 minutes to obtain a capsule solution.

Figure 5:
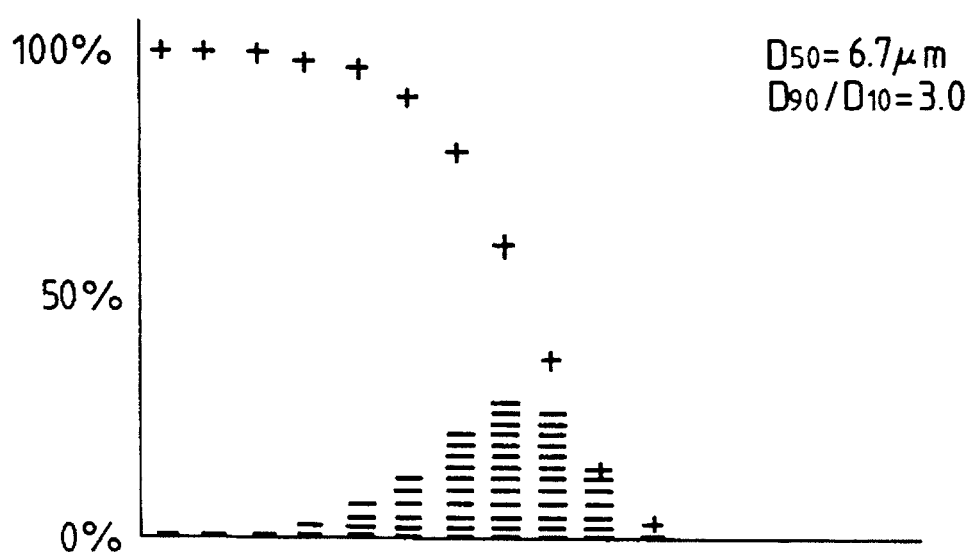

The capsule solution was then measured for particle size distribution using a Coulter counter Type TA-II. As shown in FIG. 5, the capsule specimen exhibited a wide particle size distribution (D50=6.7 μm; D90/D10=3.0).

To the capsule solution thus obtained were added 2,000 gm of a 15% aqueous solution of a polyvinyl alcohol, 600 gm of a carboxy-modified SBR latex in the form of solid, and 1,200 gm of a particulate starch (average particle size: 15 μm).

Water was then added to the system so that the solid concentration was adjusted to 20% to prepare a coating solution.

The coating solution thus obtained was coated on a paper sheet with a density of 40 gm/m$^2$ in such an amount that the dried weight thereof reached 4.0 gm/m$^2$, and then dried to prepare a microcapsule sheet.

Comparative Example 2

The same oily solution as used in Example 1 was poured into the same aqueous solution as used in Example 1 while the latter was stirred at 1,500 rpm by a dissolver with a blade diameter of 100 mm. The agitation lasted for one minute. Thus, an oil-in-water type emulsion was formed. To the emulsion was added 2,000 gm of water at a temperature of 20° C. The system was gradually heated to a temperature of 65° C. where it was held for 90 minutes to obtain a capsule solution.

The capsule solution was then measured for particle size distribution using a Coulter counter Type TA-II. The capsule specimen exhibited a wide particle size distribution (D50= 7.9 μm; D90/D10=4.3).

To the capsule solution thus obtained were added 2,000 gm of a 15% aqueous solution of a polyvinyl alcohol, 600 gm of a carboxy-modified SBR latex in solid form, and 1,200 gm of a particulate starch (average particle size: 15 μm).

Water was then added to the system so that the solid concentration was adjusted to 20% to prepare a coating solution.

The coating solution thus obtained was coated on a paper sheet with a density of 40 gm/m$^2$ in such an amount that the dried weight thereof reached 4.0 gm/m$^2$, and then dried to prepare a microcapsule sheet.

EXAMPLE 3

As color developers, 120 gm of 2-anilino-3-methyl-6-N-ethyl-N-isopentylaminofluorane and 20 gm of 2-dibenzylamino-6-diethylaminofluorofurane were dissolved in 2,000 gm of 1-phenyl-1-xylyethane. In the oily solution thus obtained were dissolved 160 gm of a carbodiimide-modified diphenylmethane diisocyanate (Millionate MTL available from Nihon Polyurethane K.K.) and 160 gm of a biuret compound of hexamethylene diisocyanate (Sumidule N-3200 available from Sumitomo Bayer Urethane K.K.) as polyvalent isocyanates, and 64 gm of a butylene oxide adduct of ethylene diamine (added amount of butylene oxide per o ethylene diamine: 16.8 mol; molecular weight: 1,267) as alkyl oxide adduct of amine to prepare an oily solution.

300 gm of a polyvinyl alcohol was dissolved in 2,700 gm of water to prepare an aqueous solution. The oily solution was then poured into the aqueous solution while the latter was stirred at 800 rpm using a propeller agitator with a blade diameter of 70 mm to prepare an oil-in-water type emulsion as preemulsion.

The preemulsion was then processed at a single pass in the apparatus as shown in FIG. 1 at a flow rate of 1 kg/min and 1,500 rpm with the clearance between the inner cylinder and the outer cylinder set to 300 μm to obtain an emulsion. To the emulsion was added 2,000 gm of water at a temperature of 20° C. and 7.2 gm of diethylene triamine as polyvalent amine. The system was stirred at room temperature for 10 minutes, and heated to a temperature of 65° C. where it was held for 60 minutes to obtain a capsule solution.

The capsule specimen was then measured for particle size distribution using a Coulter counter Type TA-II. The specimen exhibited an extremely high uniformity in particle size distribution (D50=7.0 μm; D90/D10=1.70).

To the capsule solution thus obtained were added 1,600 gm of a 15% aqueous solution of a polyvinyl alcohol, 400 gm of a carboxy-modified SBR latex in the form of solid, and 1,000 gm of a particulate starch (average particle size: 15 μm).

Water was then added to the system so that the solid concentration was adjusted to 20% to prepare a coating solution. The coating solution thus obtained was coated on a paper sheet in such an amount that the dried weight thereof reached 4.0 gm/m$^2$, and then dried to prepare a microcapsule sheet.

Comparative Example 3

The same oily solution as used in Example 3 was poured into the same aqueous solution as used in Example 3 while the latter was stirred at 2,000 rpm by a dissolver with a blade diameter of 100 mm. The agitation lasted for 1 minute. Thus, an oil-in-water type emulsion was formed.

To the emulsion was added 2,000 gm of water with a temperature of 20° C. and 7.2 gm of diethylene triamine as polyvalent amine. The system was stirred at room temperature for 10 minutes, and then gradually heated to a temperature of 65° C. where it was held for 60 minutes to obtain a capsule solution.

The capsule solution was then measured for particle size distribution using a Coulter counter Type TA-II. The capsule specimen exhibited a wide particle size distribution (D50= 7.1 μm; D90/D10=3.3).

To the capsule solution thus obtained were added 1,600 gm of a 15% aqueous solution of a polyvinyl alcohol, 400 gm of a carboxy-modified SBR latex in the form of solid, and 1,000 gm of a particulate starch (average particle size: 15 μm).

Water was then added to the system so that the solid concentration was adjusted to 20% to prepare a coating solution.

The coating solution thus obtained was coated on a paper sheet with a density of 40 gm/m$^2$ in such an amount that the dried weight thereof reached 4.0 gm/m$^2$, and then dried to prepare a microcapsule sheet.

For the evaluation of properties, these microcapsule sheets were each combined with a developer sheet to prepare pressure-sensitive recording sheets. The results are set forth in Table 1. The evaluation tests were carried out as follows:
1) Test for coloring properties Microcapsule sheets prepared as discussed above were each laminated with a developer sheet. Onto these laminates were continuously typed a lowercase letter "m" using an electronic typewriter (IBM model 6747), and the typed letters were then colored. After one day, the specimens were measured for type density D (typewriter) in the visible range by a Macbeth RD-918 type densitometer.
2) Test for pressure resistance These microcapsule sheets were each laminated with a developer sheet. These laminates were each subjected to a load of 10 kg/cm$^2$ so that the developer sheet was fogged.

These laminate specimens were aged for three days, and then measured for fog density D (fog) on the developer sheet at 610 nm using a Type 307 Hitachi Color Analyzer.

The results of these tests are set forth in Table 1.

TABLE 1

|  | Example 1 | Example 2 | Example 3 | Comparative Example 1 | Comparative Example 2 | Comparative Example 3 |
| --- | --- | --- | --- | --- | --- | --- |
| 1) Particle size (D50) μm | 6.5 | 7.8 | 7.0 | 6.7 | 7.9 | 7.1 |
| 2) Particle size distribution (D90/D10) | 1.69 | 1.70 | 1.70 | 3.0 | 4.4 | 3.3 |
| 3) Coloring properties (typewriter) | 0.50 | 0.53 | 0.49 | 0.45 | 0.49 | 0.43 |
| 4) Pressure resistance D (fog) | 0.077 | 0.082 | 0.078 | 0.102 | 0.121 | 0.098 |

As shown in Table 1, as compared to the comparative microcapsule sheets, the microcapsule sheets of the present invention exhibited quite excellent properties, i.e., excellent coloring properties and pressure resistance.

In Table 1, D10, D50 and D90 are percentage particle sizes determined from cumulative volume distribution.

In other words,

D10: cumulative 10% particle size,

D50: cumulative 50% particle size, and

D90: cumulative 90% particle size.

When an emulsifying apparatus according to the present invention is used, a uniform shearing force can be applied to the emulsion, which is not possible with prior art emulsifying apparatus such as dissolver. Therefore, an emulsion with a small particle size and a uniform particle size distribution can be produced. Microcapsules prepared from this emulsion exhibit a small particle size and a uniform particle size distribution. For example, if these microcapsules are used for pressure-sensitive recording sheets, the resulting pressure-sensitive recording sheets exhibit excellent coloring properties as well as excellent pressure resistance.

While the invention has been described in detail and with reference to specific embodiments thereof, it will be apparent to one skilled in the art that various changes and modifications can be made therein without departing from the spirit and scope thereof.

What is claimed is:

1. A process for the preparation of microcapsules having a polyurethane urea resin wall membrane, comprising the steps of:

mixing an oily solution and an aqueous solution;

passing the resulting mixed solution through a clearance between an inner cylinder and an outer cylinder, wherein a diameter of each of said inner cylinder and said outer cylinder remains constant for an entire longitudinal length of said inner cylinder and said outer cylinder;

rotating said inner cylinder and said outer cylinder relative to each other to form an oil-in-water type emulsion, wherein said clearance is in a range from 0.05 to 5 mm, said clearance being held constant over an entire longitudinal length of said inner cylinder and said outer cylinder causing a uniform shearing force to be applied to said resulting mixed solution to obtain a narrow particle size distribution of particles in said resulting mixed solution; and forming said polyurethane urea resin wall membrane on said emulsion.

2. The process for the preparation of microcapsules as claimed in claim 1, wherein the clearance between the inner cylinder and the outer cylinder is in the range of 0.1 to 2 mm.

3. The process for the preparation of microcapsules as claimed in claim 1, wherein a retention time of the emulsion in the clearance is at least 0.02 seconds.

4. The process for the preparation of microcapsules as claimed in claim 1, wherein a retention time of the emulsion in the clearance is at least 0.2 seconds.

5. The process for the preparation of microcapsules as claimed in claim 1, wherein the inner and outer cylinders are arranged in the form of column.

* * * * *